United States Patent Office 3,178,403
Patented Apr. 13, 1965

3,178,403
PRODUCTION OF CIS-1,4 POLYBUTADIENE WITH A CARRIER SUPPORTED CATALYST OF NICKEL OR A NICKEL OXIDE
Kenichi Ueda, Tokyo, and Akira Onishi, Toshio Yoshimoto, Junichi Hosono, and Tsuyoshi Matsumoto, Yokohama, Japan, assignors to Bridgestone Tire Company Limited, Tokyo, Japan
No Drawing. Filed Jan. 4, 1960, Ser. No. 80
Claims priority, application Japan, Jan. 26, 1959, 34/1,825; Mar. 9, 1959, 34/7,134; Aug. 6, 1959, 34/25,176; Sept. 30, 1959, 34/30,991, 34/30,992
2 Claims. (Cl. 260—94.3)

This invention relates to a new method of manufacturing polymers of butadiene, more particularly to the production of solid polymers of butadiene having a high content of cis-1,4 structure by polymerization, and also to the production of new catalysts to be used for the method.

Owing to the prospective lack of natural rubber in the future, various studies have been carried out to obtain synthetic rubbers having almost the same properties as natural rubber and capable of use for the same general purposes. Among the synthetic rubbers available for use as a substitute for natural rubber the most probable one, at present, in properties as well as from the point of economy is cis-1,4 polybutadiene.

There are three known processes for obtaining butadiene polymers containing a high cis-1,4 structure. First, the method using a catalyst consisting of butyl-lithium and titanium trichloride; second, the method of polymerization using a catalyst consisting of trialkyl aluminum and titanium tetraiodide; third, the polymerization process using a catalyst consisting of triisobutylaluminum and titanium tetrabromide.

The above known processes do not necessarily always give polymers of high cis content, and they need to be carried out under severe conditions for obtaining high cis content polymers. The polymerization reactions in the said known processes are retarded or inhibited in the presence of a small amount of water or oxygen and they are very sensitive to the properties of solvents and the ratio of composition of catalysts and tend to give a considerable amount of polymers insoluble in organic solvent (gel). Moreover the catalysts employed in these processes are expensive.

One object of our invention is to provide a novel process for polymerizing butadiene in contact with novel catalysts. The other object of our invention is to provide a novel catalytic process for producing solid and elastic polymers of butadiene having substantially all cis-1,4 structure which comprise polybutadienes of extremely high cis-content not obtainable by the above known methods.

The polymer having "substantially all cis-1,4 structure" means the polymer containing at least 90% or more cis-1,4 structure when the microstructure of the polymer is analized by the infrared spectroscopic method proposed by Hampton (Anal. Chem., 21, 923 (1949)).

This invention is based on the recognition of the fact that the reduced or oxidized nickel to be explained hereinafter is a directional catalyst for the polymerization of butadiene and it enables to manufacture the solid polymer having a high content of cis-1,4 structure.

The catalyst to be employed in this invention is a substance ($a$) selected from the group consisting of metallic nickel, nickelous oxide (NiO), nickelosic oxide ($Ni_3O_4$), nickelic oxide ($Ni_2O_3$) and mixtures thereof adhered to a carrier selected from the group consisting of diatomaceous earth, silica and silica-alumina, wherein the metallic nickel adhered to the carrier is produced by reduction of a nickel compound adhered to the carrier with hydrogen and said oxides of nickel adhered to the carrier are produced by oxidation of a substance ($b$) selected from the group consisting of a nickel salt and the metallic nickel adhered to the carrier with a mixture of oxygen and nitrogen. The solid substance ($a$) may be obtained, for example, at any step of a process in which metallic nickel is oxidized to nickelic oxide by bringing it into contact with oxidizing gas or in which nickelic oxide is reduced to metallic nickel by bringing it into contact with reducing gas.

"The reduced nickel" used in the method of this invention is to be understod to mean the metallic nickel which is produced by the reduction or decomposition of nickel compounds. "The oxidized nickel" means not only an oxide of nickel but also a mixture of oxides of nickel.

"The oxidized nickel" can be prepared: (1) by thermal decomposition of nickel salts in the presence or absence of oxidizing gas; (2) by partial or complete oxidation of the reduced nickel prepared by the similar method for ordinary hydrogenation catalyst with oxidizing gas; (3) by partial reduction of oxides of the nickel of higher valency with reducing gas.

The catalytic metal or metal oxide used in this invention has a comparatively large surface area.

The following points can be mentioned as features of the method of this invention.

(1) By using the catalyst-system of this invention the elastic high polymers of stereoregularity, namely, polybutadiene of at least 70% cis-1,4 structure content, in general of more than 90%, and under suitable polymerization conditions of more than 95%, can be obtained. Moreover the content of cis-1,4 structure can be controlled by changing polymerization conditions and the reproducibility is excellent.

(2) All of the polymers obtained by using this catalyst-system are soluble in organic solvents and no gel is produced.

(3) The polymerization is effected easily under moderate reaction conditions of low pressure and room temperature in general. Usually the polymerization is carried out in a solvent but cis-1,4 polybutadiene can be prepared even when solvent is not used. Air, carbon dioxide and city gas may be used for gas phase of the reaction system though nitrogen is of general use. It is not necessary to completely purify the butadiene and hydrocarbons that are not able to be polymerized may be contained in the monomer.

(4) The preparation, handling, storing and transportation of the catalyst of this invention are carried out easily and safely and the catalyst of this invention is usually less expensive.

(5) Since all or the main part of the catalyst-system of this invention is solid and the polymer can be taken out in the form of a solution after the reaction, it is very easy to separate the catalyst from the reaction mixture. Besides, since no gel is made as cited in (2) the purification of polymer is simple.

(6) As the consequence of the feature (5), if necessary, the solid part of the catalyst system of this invention is able to be recovered, reactivated and used repeatedly.

According to one way of carrying out this invention use is made of reduced nickel adhered to a carrier as catalyst and the polymerization reaction is effected in the liquid phase by contacting butadiene with the reduced nickel.

To the reduced nickel is added a suitable solvent and butadiene monomer in inert atmosphere and the mixture is stirred, if necessary, with heating for a given time. The reaction generally proceeds smoothly without large generation of heat and after the polymerization reaction polymer can be taken out in solution form.

The reduced nickel used in this invention is adhered to a suitable carrier, such as diatomaceous earth, silica, silica-alumina, active clay, kaolin, zirconia or titania. When the reduced nickel-carrier is molded graphite may be added as a binder with the similar effectiveness for polymerization. The reduced nickel to which any of copper, chromium or copper-chromium etc. is added in a range of trace to 5 wt. percent may be used.

According to the method of this invention, butadiene polymers containing considerably higher cis-1,4 structure than the polymer which is obtainable by using the catalyst consisting of triisobutylaluminum and titanium tetrabromide, and polymers containing high cis-1,4 structure as much as the polymer obtained with the catalyst consisting of triethylaluminum and titanium tetraiodide can be obtained.

According to some of the methods developed by this invention it is possible to obtain solid polymers containing substantially all cis-1,4 structure, and in that case the content of trans-1,4 structure and vinyl structure as a whole is less than 3% of the total polymer.

According to further way of carrying out this invention use is made of oxidized nickel adhered to a carrier as catalyst and the polymerization reaction is effected in liquid phase by contacting butadiene with oxidized nickel.

The oxidized nickel catalyst to be used in the method of this invention may be produced by thermal decomposition of nickel salts adhered to a suitable carrier and also it may be produced by either purifying or partially reducing the thermally decomposed nickel salts by bringing them into contact with reducing gases at a temperature lower than 600° C. The oxidized nickel catalyst may be also produced by another procedure, that is, after perfectly reducing the thermally decomposed substances as in the manufacture of ordinary hydrogenation catalysts it is brought into contact with oxidizing gas to oxidize partial or total nickel. As the reducing gas, use is usually made of hydrogen gas, and as the oxidizing gas usually oxygen, or a mixture of oxygen and nitrogen may be used. As a carrier, porous solid such as zirconia, titania, silica, silica-alumina, diatomaceous earth, active clay, kaolin or a solid consisting of these components is used. The oxidized nickel catalyst may contain trace to 5 wt. percent of an oxide of other transition metal, such as copper, chromium, cobalt or iron. When the oxidized nickel catalyst adhered to the carrier is molded graphite can be used as a binder.

As the solvent, hydrocarbons of aromatic, alicyclic or aliphatic series such as benzene, toluene, a xylene, cyclohexane, pentane, hexane and heptane which are substantially dehydrated may be used. Aromatic hydrocarbons give generally good results. Moreover, the polymerization may be carried out in excess butadiene as a reaction medium.

The contact of butadiene with the catalyst may be effected by means of various known processes such as those using a fixed bed, a moving bed or a suspension catalyst. One of these processes is that in which butadiene dissolved in said solvent or liquefied butadiene alone is brought into contact with the catalyst. In another process, butadiene is introduced after the catalyst has been dispersed in a solvent. The condition of bringing buadiene into contact with the catalyst may be selected within the range of —30° C. to 200° C., preferably of 0° C. to 100° C.

The treatment of the polymerization product depends on the type of polymerization reaction. The polymer is usually completely dissolved in solvent and the catalyst precipitates. In such a case the solution of polymer can be easily separated by siphoning or filtering from catalyst. When the viscosity of the solution is high a part of the catalyst remains suspended in the solution. In such a case a suitable amount of solvent should be added to the solution to reduce its viscosity and then it is subjected to the filtration or centrifugal separation and if necessary a warmed solvent is further added to the separated catalyst to extract remaining polymer. For the isolation of the polymer from its solution which has been perfectly separated from the catalyst, the solution should be subjected to the distillation under reduced pressure or in vacuo to eliminate a solvent or the polymer is precipitated by adding non-solvent such as lower alcohol or lower ketone and dried in vacuo.

Some examples of this invention will be described in the following:

Example I

To diatomaceous earth was added 20% nickel sulphate aqueous solution until the reduced nickel-diatomaceous earth contained 50% nickel and then the mixture was treated with sodium carbonate aqueous solution to precipitate basic nickel carbonate. The basic nickel carbonate-diatomaceous earth was molded to a cylinder of 6 mm. x 6 mm., baked in air and then reduced by hydrogen. The reduced nickel thus obtained can be used for ordinary hydrogenation.

The reduced nickel-diatomaceous earth (Ni content 50%) thus obtained was stored in a solvent such as heptane or benzene not to bring it into contact with air. 10 gr. of it was placed into a pressure bottle in nitrogen current and 60 cc. of benzene and 0.3 mole of butadiene were added thereto in nitrogen atmosphere and sealed. Polymerization was carried out at 30° C. for 20 hours while stirring. After a given time, the catalyst was separated and butadiene polymer dissolved in benzene was taken out and precipitated with methanol, and the precipitate was dried, then about 4.5 gr. of solid and elastic polymer was obtained. Infrared analysis showed that the polymer consisted of 97.5% cis-1,4 structure, 1.5% trans-1,4 structure and 1.0% vinyl structure.

Example II

The basic nickel carbonate-diatomaceous earth prepared in the same manner as in Example I was pulverized to smaller than about 200 mesh, then baked at 350° C. in an electric furnace in air and reduced by hydrogen at 360° C. for about 8 hours. 1.51 gr. of the pulverized reduced nickel-diatomaceous earth catalyst thus obtained and 25 cc. of benzene were placed in a pressure bottle and 0.25 mole of butadiene was introduced. After sealed, the pressure bottle was revolved at 45° C. for 3 hours in a thermostat.

The polymer was taken out at a given time in the same manner as in Example I. 4.79 gr. of elastic solid polymer was obtained. No gel was made in the polymerization. Infrared analysis showed the polymer consisted of 94.4% cis-1,4, 2.6% trans-1,4, and 3.0% vinyl structure. The intrinsic viscosity was 1.86, measured in toluene at 25° C.

Example III

The pulverized reduced nickel-diatomaceous earth catalyst was prepared by the same method as in Example II. 1.38 gr. of this catalyst was placed in a pressure bottle, then 22 cc. of ethyl bromide and 0.2 mole of butadiene were added. The polymerization was effected in the same manner and same conditions as in Example II. It gave 2.22 gr. of soft solid polymer soluble in benzene and no gel. Infrared analysis showed the polymer consisted of 90.9% cis-1,4, 5.9% trans-1,4, and 3.2% vinyl structure.

Example IV 1.44 gr. of the pulverized reduced nickel diatomaceous earth catalyst prepared by the same method as in Example II was placed in a pressure bottle, then 27 cc. of carbon tetrachloride and 0.27 mole of butadiene were introduced. The polymerization was effected in the same manner and same conditions except 5 hours instead of 3 hours as that of Example II. 2.05 gr. of the slightly soft solid polymer was obtained. No gel was made in the polymerization. Infrared analysis showed that this polymer consisted of 90.0% cis-1,4, 6.5% trans-1,4 and 3.2% vinyl structure.

Example V

The outline of the method of preparing silica alumina gel was given in the following; 1 l. of 3 N sodium silicate aqueous solution was treated with hydrochloric acid to give the white gel. To the gel was added 480 cc. 3 N aluminum nitrate aqueous solution, and then was added the aqua ammonia dropwise with stirring. The mixture was aged and washed. After dried for about 2 hours at 110° C. the gel was heated at 500° C. for 5 hours in air. 16 gr. of the silica-alumina gel prepared by the above method (alumina 8% by weight) was placed in a nickel nitrate aqueous solution (34 gr. of $Ni(NO_3)_2 \cdot 6H_2O$ in 50 cc. of water) and the mixture was stirred well to be a uniform slip. This white slip was made to pH of 9 with 20% sodium carbonate aqueous solution to precipitate light green substance. After washed with water the precipitate was dried for 16 hours at about 110° C. and puverized. The yield was about 28 gr.

The light green substance thus obtained (basic nickel carbonate-silica alumina) was reduced by hydrogen at 380° C. for 5 hours in electric furnace and the reduced nickel-silica alumina catalyst (Ni content was about 30%) was obtained. 1.21 gr. of this catalyst and 23 cc. of benzene were placed in a pressure bottle and 0.28 mole of butadiene was added. The polymerization was effected under the same conditions as in Example II. The polymer was taken out at a given time in the same manner as in Example I and 5.81 gr. of elastic solid polymer was obtained. No gel was made in the polymerization. The infrared anlysis showed that the polymer consisted of 95.9% cis-1,4, 1.5% trans-1,4, and 2.6% vinyl structure. The intrinsic viscosity was 2.59, measured in toluene at 25° C.

Example VI

In a similar manner to the manufacture of reduced nickel-diatomaceous earth catalyst to be used for usual hydrogenation, 20% nickel sulphate aqueous solution was added to diatomaceous earth up to the nickel content of 50% against diatomaceous earth, then aqueous solution of sodium carbonate was added thereto to precipitate basic nickel carbonate. After the precipitate was washed with water it was molded into a cylinder of 6 mm. x 6 mm. and baked and reduced by hydrogen.

The reduced nickel-diatomaceous earth catalyst is pyrophoric in air so that it should be stored after stabilized by partial oxidation with a mixture of oxygen and nitrogen. The oxidized nickel-diatomaceous earth could be produced by oxidizing the stabilized nickel with dry air supplied by a blower at 450° C. for 5 hours. The stabilized nickel-diatomaceous earth can be well attracted by a magnet but the oxidized nickel-diatomaceous earth can never be attracted. According to the study of Ipatieff (W. Mellor, A Comprehensive Treatise on Inorganic and Theoretical Chemistry, volume 15, p. 374) the oxidized nickel thus obtained has become perfectly to NiO.

10 gr. of the oxidized nickel diatomaceous earth catalyst and 40 cc. of benzene dehydrated by metallic sodium were introduced in a pressure bottle and then 25 cc. of liquid butadiene dried with caustic potash and calcium chloride and dehydrated by cooling to a temperature of −78° C. was put in the bottle and tightly sealed. After the mixture was stirred by revolving the bottle at a speed of 40 r.p.m. for 20 hours at 40° C. in a thermostat the bottle was taken out and unreacted butadiene was expelled. 100 cc. of benzene was added to the polymer solution and after well shaked it was left to stand still to precipitate a greater part of the catalyst. After the suspended catalyst was perfectly removed by centrifuge an antioxidant was added thereto and then it was poured into an excess methanol to precipitate polymer. The polymer was dried in vacuo at room temperature and 3.3 gr. of solid elastic polymer was obtained. Infrared analysis showed that the polymer consisted of 96% cis-1,4 structure, 2% trans-1,4 structure and 2% vinyl structure. The intrinsic viscosity of this polymer was 1.1 at 25° C. as a toluene solution.

Example VII

A reduced nickel-silica catalyst (nickel content was 25%) having the silica gel as a carrier which was baked at 400° C. was prepared by the same procedure as in the preparation of said nickel-diatomaceous earth catalyst and then it was heated while passing dry air at 450° C. for 5 hours and the oxidized nickel-silica catalyst was manufactured.

Butadiene was polymerized by using this catalyst according to the same process as said polymerization, i.e., 10 g. of the catalyst, 25 cc. of butadiene and 40 cc. of benzene were put in a reaction vessel and stirred by revolving the vessel at 40° C. for 20 hours to effect polymerization, and 3.6 gr. of solid elastic polymer was yielded. Infrared analysis showed that the polymer consisted of 94% cis-1,4 structure, 4% trans-1,4 structure and 2% vinyl structure.

Example VIII

A mixture of acid clay and basic nickel carbonate and a small amount of chromium carbonate was prepared by the same procedure as that of Example VI, with the weight ratio of acid clay to nickel to chromium of 1:1:0.2. This mixture was reduced at 380° C. by hydrogen and then stabilized with the mixed gas of nitrogen and air of 1:1. The catalyst thus prepared consisted mainly of nickel, nickel oxide and acid clay and a small amount of chromium and oxidized chromium. 10 gr. of this catalyst, 25 cc. of butadiene and 40 cc. of benzene were put in a reaction vessel and the polymerization was effected for 20 hours at 40° C. while stirring end to end and 0.9 gr. of solid elastic polymer was obtained. Infrared analysis showed that the polymer consisted of 97% cis-1,4 structure, 2% trans-1,4 structure and 1% vinyl structure.

What we claim is:

1. A method of manufacturing a solid butadiene homopolymer having at least 90% of the cis-1,4 configuration and no gel which comprises contacting butadiene with a substance (a) selected from the group consisting of metallic nickel, nickelous oxide (NiO), nickelosic oxide ($Ni_3O_4$), nickelic oxide ($Ni_2O_3$) and mixtures thereof adhered to a carrier selected from the group consisting of diatomaceous earth, silica and silica-alumina, wherein the metallic nickel adhered to the carrier is produced by reaction of a nickel compound adhered to the carried with hydrogen and said oxides of nickel adhered to the carrier are produced by oxidation of a substance (b) selected from the group consisting of a nickel salt and the metallic nickel adhered to the carrier with a mixture of oxygen and nitrogen, and wherein the polymerization reaction is effected in liquid phase, under a pressure sufficient to maintain the reaction system in liquid phase in an inert atmosphere and at a temperature of from about −30° C. to about 200° C.

2. A method according to claim 1, wherein said mixtures of metallic nickel and nickel oxide adhered to a carrier are prepared by oxidizing a part of metallic nickel adhered to the carried by a mixture of nitrogen and air at a temperature sufficient to convert pyrophoric metallic nickel-carrier to non-pyrophoric stabilized nickel-carrier.

References Cited by the Examiner
UNITED STATES PATENTS 2,486,361  10/49  Nahin _____ 196—28
2,606,940  8/52  Bailey et al. _____ 260—94.9

(Other references on following page)

UNITED STATES PATENTS

| | | | |
|---|---|---|---|
| 2,717,888 | 9/55 | Feller | 260—94.9 |
| 2,717,889 | 9/55 | Feller | 260—94.9 |
| 2,727,023 | 12/55 | Evering | 260—94.9 |
| 2,824,089 | 2/58 | Peters | 260—88.1 |
| 2,925,392 | 2/60 | Seelbach | 252—429 |
| 2,965,627 | 12/60 | Field et al. | 260—94.9 |
| 3,032,544 | 5/62 | Longiave et al. | 260—94.3 |
| 3,049,526 | 8/62 | D'Alelio | 260—94.3 |
| 3,066,123 | 11/62 | Strohmayer et al. | 260—94.3 |

FOREIGN PATENTS 573,680  12/58  Belgium.
(Corresponds to 914,246, Great Britain)

OTHER REFERENCES

Emmett: Catalysis, volume 1, Reinhold, New York, 1954, pages 324, 334–335.

JOSEPH L. SCHOFER, *Primary Examiner*.

M. LIEBMAN, L. H. GASTON, *Examiners*.